UNITED STATES PATENT OFFICE.

HEINRICH BRUNE AND HEINRICH HORST, OF NEUSTADT-ON-THE-HARDT, GERMANY, ASSIGNORS TO EUGEN ABRESCH, OF NEUSTADT-ON-THE-HARDT, GERMANY.

DRYING COAL-SLIMES.

1,100,710. Specification of Letters Patent. Patented June 23, 1914.

No Drawing. Application filed October 28, 1912. Serial No. 728,272.

*To all whom it may concern:*

Be it known that we, HEINRICH BRUNE and HEINRICH HORST, both citizens of the German Empire and residents of Neustadt-on-the-Hardt, Germany, with the post-office address Hetzelstrasse 22, have invented new and useful Improvements in Drying Coal-Slimes, of which the following is a specification.

This invention relates to a process for removing the water from coal slimes. As is well known the coal slimes, which are obtained as a waste product in the washing of coal, are of little value on account of their high content of water, amounting to about 30 per cent.

This invention purposes to make from these slimes a useful marketable fuel. With this object the slimes are made capable of filtration by addition of coke slack or coking coal. After such addition they are easily dried with the result that the slimes combined with the added material form a highly valuable fuel. The water may be removed either by air drying or by subjecting the mixture to a very gradually rising pressure.

It is known that small coal can be dried by an increasing pressure, such as a pressure which rises in the course of 5 to 10 seconds from zero to a certain maximum. By such a rapid rise of pressure, however, coal slimes cannot be deprived of water, whether mixed with the aforesaid materials or not.

The slimes can only be made capable of filtration by addition of coke slack or coking coal according to this invention, and the drying can be carried out with success if the mixture is subjected to a very gradually increasing pressure, for instance a pressure increasing from zero to the maximum in the course of about 2½ minutes. The mass obtained by this process is dry and solid and can be burnt directly. The coal slimes cake in the fire with the coke slack and develop such a high temperature that even the difficultly kindled coke slack also burns.

Having thus described our invention and the best means we know of carrying the same into practical effect, we claim:—

A process of rendering coal slime useful and making briquets therefrom without the use of a binding agent, which consists in mixing with the coal slime coke slack or the like, and forming from the mixture dry briquets ready for immediate use in a single operation by subjecting the mixture to a slowly increasing pressure.

In testimony, that we claim the foregoing as our invention, we have signed our names in presence of two witnesses, this 15th day of October, 1912.

HEINRICH BRUNE.
HEINRICH HORST.

Witnesses:
MICHAEL ZIMMERMANN,
WILHELM RIRORHENMANN.